United States Patent [19]

McGuire

[11] Patent Number: 4,971,105
[45] Date of Patent: Nov. 20, 1990

[54] HYDRAULIC FLUID INJECTION APPARATUS

[76] Inventor: George E. McGuire, 8207 Dorchester St., Spring Valley, Calif. 92077

[21] Appl. No.: 465,960

[22] Filed: Jan. 16, 1990

[51] Int. Cl.$^5$ ............................................. E03B 7/07
[52] U.S. Cl. ................................................ 137/564.5
[58] Field of Search ...................................... 137/564.5

[56] References Cited

U.S. PATENT DOCUMENTS

| | | | |
|---|---|---|---|
| 549,479 | 11/1895 | Hall | 137/564.5 |
| 1,297,622 | 3/1919 | Whittaker | 137/564.5 X |
| 1,736,803 | 11/1929 | Shields | 137/564.5 X |
| 2,323,618 | 7/1940 | Ottoson | 137/564.5 X |
| 3,200,840 | 8/1965 | Watts | 137/564.5 |
| 3,410,305 | 11/1968 | Hicks, Jr. | 137/564.5 |
| 4,047,541 | 9/1977 | Mercier | 137/564.5 |
| 4,682,734 | 7/1987 | Proctor et al. | 137/564.5 X |

*Primary Examiner*—John Rivell
*Attorney, Agent, or Firm*—Andsel Group, Inc.

[57] ABSTRACT

A hydraulic fluid injection apparatus is described that has a container that has a chamber with a first, second and return means section. There are two pistons with a seal means on each piston and the two pistons are connected by a rod. Input fluid pressure by a pressurized first fluid, such as water, on the first piston causes the second piston to move and pressurize a second fluid, such as an insecticide, out of the second section and into a mixing line, through a calibrated metering means and into an output fluid line to be joined by the first fluid arriving from the first section of the chamber. There is a mixing means in the output fluid line to mix the two fluids more thoroughly. There is a return means in the return means section of the chamber that returns the second piston to a lower position when the pressure on the first piston is less than the return force of the return means and allows the second section to be refilled as necessary. A number of one-way valves are supplied to allow fluid movement in only the desired direction. A stop means in the first section limits the travel of the first piston.

4 Claims, 1 Drawing Sheet

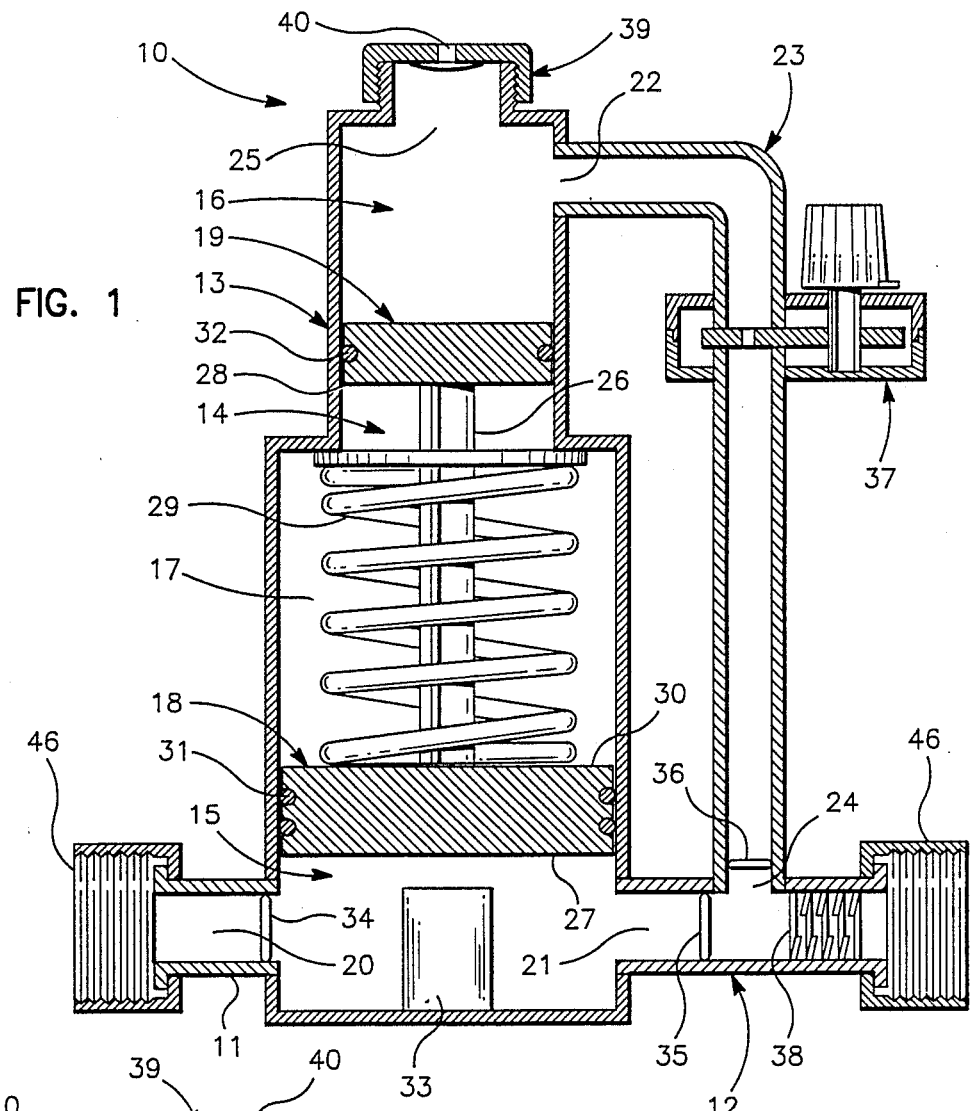
FIG. 1
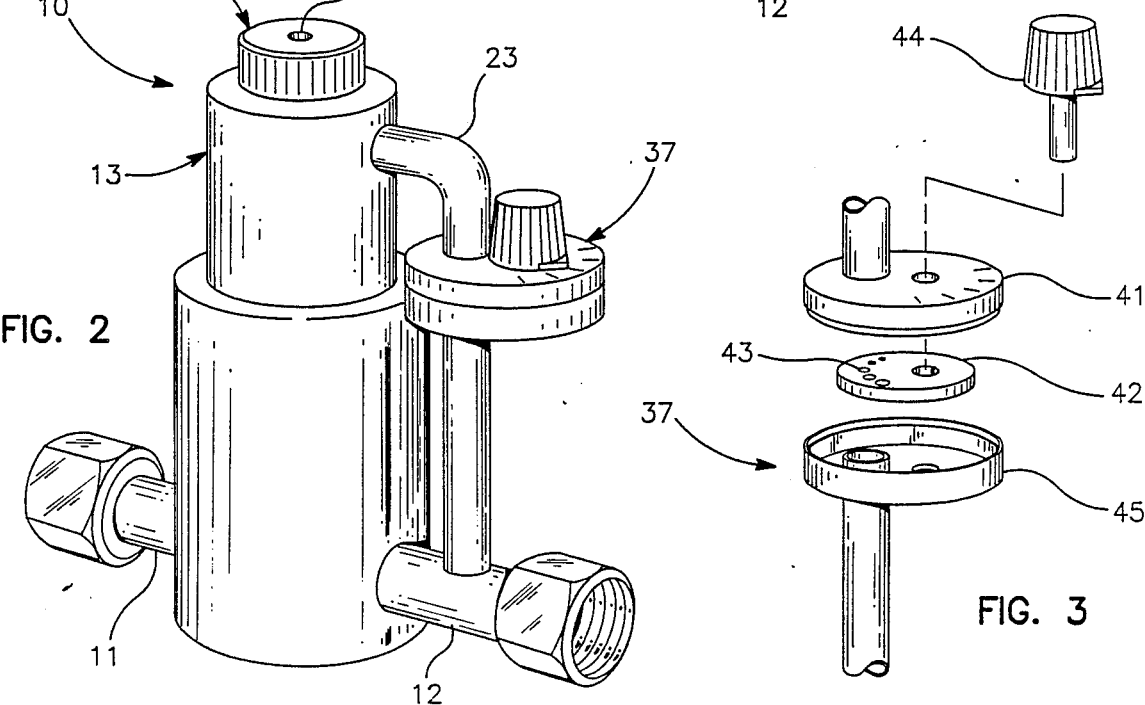
FIG. 2
FIG. 3

HYDRAULIC FLUID INJECTION APPARATUS

BACKGROUND OF THE INVENTION

1. Field of the Invention

This invention relates to a fluid and chemical mixture injection apparatus that injects a calibrated amount of chemical into a fluid flow exiting the apparatus so that the ratio of chemical to fluid flow exiting the apparatus is not dependent on the pressure of a fluid supplied to the apparatus.

2. Description of Related Art

In the past, various configurations of chemical dispensers have been used to dispense soaps, perfumes, fertilizers, insecticides and numerous other liquids. The pressure of the fluid to be mixed with the chemical very often affected the ratio of chemical to the fluid with which it was to be mixed. This often led to an uneven application of liquid. If the correct ratio was critical, incorrect applications were costly and wasteful. Some of these devices also allowed the chemical to backflow into the water source thus contaminating the water source.

U.S. Pat. No. 1,297,622 to A. Whittaker on Mar. 18, 1919 shows a sprayer apparatus with a three way valve to control the amount of chemical entering the hose and mixing with the water.

U.S. Pat. No. 1,736,803 to T. C. Shields, et. al. on Nov. 26, 1929 describes a shower that has a piston supplying pressure to a chemical but lacks a calibrated or accurate flow regulator and there is no backflow protection between the pistons.

U.S. Pat. No. 2,323,618 to O. Ottoson on July 6, 1940 for a spray gun has a simple three way valve that restricts the flow of the chemical and has a series of evenly spaced numbers to allow the user to remember where the valve was placed. As chemical is used, water forces a piston down to reduce air pockets.

U.S. Pat. No. 3,200,840 to J. H. Watts on Aug. 17, 1965 for a chemical injector for a boiler controls the flow of chemical into the boiler by restricting the length of travel of the piston.

U.S. Pat. No. 4,047,541 to Julien Mercier, et al on Sept. 13, 1977 for a liquid dispenser for a shower head uses a hose attached to the water supply pipe with a pinching spring clip to restrict the flow of water to the top of a piston that forces liquid into a water stream.

SUMMARY OF THE INVENTION

The present invention is a hydraulic fluid injection apparatus for injection of chemicals into a fluid flow such as water. The invention provides a means for injecting a chemical, often concentrated, into water or another fluid using a calibrated metering means that allows a predetermined amount of a chemical to be mixed with the water. For example, a liquidized fertilizer or insecticide may be place within the apparatus, attached to a water feed line before a spray device and a predetermined ratio of chemical to output water sent to the sprayer. The pressure of the water in the feed line will not affect the ratio of chemical to output water. As less pressure is supplied, i.e. less water, less chemical is provided proportionally and the ratio of chemical to water remains the same. This reduces the chance of placing too little or too much chemical onto the area to be treated. The apparatus is light in weight, transportable and the orientation of the apparatus does not affect its operation. It will function right-side up, tilted, on its side or upside down.

The apparatus can be attached to a simple garden hose or to rigid piping which may be attached to a fluid source such as water. Corrosive or hazardous chemicals require that the user use caution in selecting the proper materials to contain the chemicals and to be careful in the use of the chemicals.

In operation, a second fluid, such as an insecticide, is placed in the second section of the chamber in the container by removing the fill cap or closure means, which could be a threaded cap that screws onto a threaded boss or the closure means could be a plug that screws into the container, and pouring in the chemical such as an insecticide or other liquid to be mixed with a first fluid such as water. When there is no pressurized fluid in the first section of the chamber to push the second piston up into an upper position in the second section of the chamber, the return means such as a spring which compresses when the first section is pressurized, expands and returns the second piston to a lower position in the second section of the chamber. For illustration and explanation, the end of the chamber toward the closure means will be considered the upper end. The stop means which may be a bar attached to the bottom of the first section Of the chamber limits the return movement of the first and second pistons. The first piston is connected to the second piston by a rod. When the first piston is resting against the stop means, the second section of the chamber can be filled to capacity and the cap replaced. There is a seal on each piston so that the first and second fluids do not leak by the pistons and enter the return means section of the chamber and possibly intermingle the fluids and equalize the pressure in the three sections of the chamber. The fluid injection apparatus has a pressurized fluid input line which is connected to a source of pressurized first fluid such as a water hose or a rigid water pipe. The water passes through the inlet line, through the first port means and enters the first section of the chamber. There is a one-way valve or a check valve in the inlet line that does not allow the fluid in the first chamber to enter the inlet line. As the pressurized water enters the first section of the chamber the pressure forces the first piston to move which causes the second piston to move from a lower position in the second section of the chamber to an upper position in the second section and forces a portion of the fluid in the second section through the third port means, into which is connected one end of the mixing line, and into the mixing line. The fluid passing from the second section into the mixing line passes through a calibrated metering means which may be a disk with a series of carefully measured diameter flow passages calibrated to allow a preselected amount of fluid flow through them. If the pressure of the fluid entering the first section from the inlet line decreases or increases the amount of fluid exiting the second section decreases or increases in a direct relation, thereby assuring that the ratio of chemical to water always remains the same if the setting of the calibrated metering means is not changed. When the pressurized input fluid has filled the first section and started to pressurize the first section, the fluid in the first section also exits the first section through the second port means and into the fluid output line. There is a second one-way valve in the fluid output line to keep any fluid from entering the first section from the fluid output line. There is a fourth port means in the fluid output line into which is connected the other end of the mixing line. The chemical fluid flows through the mixing line into the output line and enters the first fluid in the output line. There is a third one-way valve in the mixing line to keep any fluids from entering the mixing line from the fluid output line. In order to more thoroughly mix the chemical or second fluid from the second section of the chamber with the first fluid or water in the fluid output line, there is a mixing means provided in the fluid output line to mix and agitate the two fluids. This mixing means may be at least one spiral groove of a length sufficient to agitate and swirl the fluids to enhance the combining of the fluids. There is a fourth one-way valve in the cap to allow air to enter the second section and keep fluid from exiting the cap through the fourth one-way valve.

A hydraulic fluid injection apparatus connectable between a pressurized fluid input line connected to a source of pressurized first fluid and a fluid output line that has a container having a chamber with a first section, a second section and a return means section. The return means section of the chamber is located between a first piston and a second piston. A first port means in the :container enters the first section of the chamber to connect the pressurized fluid input line and to allow a pressurized first fluid to enter the first section of the chamber. A second port means in the container enters the first section of the chamber to connect the fluid output line and to allow the pressurized first fluid to enter the fluid output line and a third port means in the container enters the second section of the chamber to connect a mixing line to the second section of the chamber and to allow a second fluid in the second section of the chamber to enter the mixing line. There is a fourth port means in the fluid output line to allow the second fluid from the mixing line to enter the fluid output line and a fifth port means in the container enters the second section of the chamber to allow the second fluid to be placed in the second section of the chamber.

A rod located in the return means section of the chamber connects the first piston in the first section of the chamber and the second piston in the second section of the chamber wherein pressure on a first surface of the first piston causes the rod to move the second piston from a lower position in the second section of the chamber to an upper position in the second section of the chamber thereby pressurizing and moving a portion of the second fluid out of the second section of the chamber into the mixing line. There is a return means in the return means section of the chamber that exerts a return force on second surface of the first piston to return the second piston to the lower position in the second section of the chamber when the pressure on the first surface of the first piston is less than the return force of the return means. A stop means in the first section of the chamber limits the travel of the first piston.

There is a first one-way valve means in the pressurized fluid input line to stop the first fluid and the second fluid from entering the pressurized fluid input line from the chamber, a second one-way valve means in the fluid output line to allow fluid flow in only one direction and a third one-way valve means in the mixing line to allow fluid flow in only one direction. A closure means releasingly seals the fifth port means and a fourth one-way valve in the closure means allows air to enter the second section of the chamber and stops the second fluid from exiting the second section of the chamber.

The hydraulic fluid injection apparatus may have a first seal means on the first piston to seal pressure and the first fluid from entering the return means section of the chamber and a second seal means on the second piston to seal pressure and the second fluid from entering the return means section of the chamber.

The hydraulic fluid injection apparatus may have a calibrated metering means attached to the mixing line to allow a preselected amount of the second fluid to flow from the second section of the chamber and into the fluid output line and a mixing means in the fluid output line to mix the second fluid with the first fluid.

It is an object of this invention to provide a hydraulic fluid injection apparatus that maintains a preset ratio of chemical to water that is not dependent on the water pressure remaining constant.

It is another object of this invention to provide a fluid injection apparatus that can be oriented in any position and still provide a preset ratio of chemical to water.

It is yet another object of this invention to provide a fluid injection apparatus wherein a fluid other than water may be placed in the first section or the second section of the chamber and be mixed to a calibrated ratio by a metering means and more thoroughly mixed by a mixing means before being applied.

BRIEF DESCRIPTION OF THE DRAWINGS

FIG. 1 is a top, front perspective view of the apparatus.

FIG. 2 is a front view, partly in section and partly in elevation, of the apparatus.

FIG. 3 is an exploded view of a type of calibrated metering means.

DESCRIPTION OF THE PREFERRED EMBODIMENT

A hydraulic fluid injection apparatus 10 that is connected between a pressurized fluid input line 11 connected to a source of pressurized fluid (not shown) and a fluid output line 12 is shown in FIGS. 1, 2, and 3. There may be a fastening means on the input line 11 and on the output line 12 to fasten a hose (not shown) or a rigid pipe (not shown). The apparatus 10 has a container 13 that has a chamber 14 with a first section 15, a second section 16 and a return means section 17. The return means seCtion 17 of the chamber 14 is located between a first piston 18 and a second piston 19.

There is a first port means 20 in the container 13 entering the first section 15 of the chamber 14 to connect the pressurized fluid input line 11 and to allow a pressurized first fluid (not shown) to enter the first section 15 of the chamber 14. There is a second port means 21 in the container 13 entering the first section 15 of the chamber 14 to connect the fluid output line 12 and to allow the pressurized first fluid (not shown) to enter the fluid output line 12. The apparatus 10 has a third port means 22 in the container 13 entering the second section 16 of the chamber 14 to connect a mixing line 23 to the second section 16 of the chamber and to allow a second fluid (not shown) in the second section 16 of the chamber 14 to enter the mixing line 23. There is a fourth port means 24 in the fluid output line 12 to allow the second fluid from the mixing line 23 to enter the fluid output line 12 and there is a fifth port means 25 in the container 13 entering the second section 16 of the chamber 14 to allow the second fluid to be placed into the second section 16 of the chamber 14.

The apparatus 10 has a rod 26 located in the return means section 17 of the chamber 14 connecting the first piston 18 in the first section 15 of the chamber 14 and the second piston 19 in the second section 16 of the chamber 14 wherein pressure on a first surface 27 of the first piston 18 causes the piston 18 and the rod 26 to move the second piston from a lower position 28 (the lower and upper position may vary according to the amount of pressurized fluid in the first section of the chamber at an given time) in the second section 16 of the chamber 14 to an upper position (not shown) in the second section 16 of the chamber 14 thereby pressurizing an moving a portion of the second fluid out of the second section 16 of the chamber 14 into the mixing line 23.

There is a return means 29 in the return means section 17 of the chamber 14 that exerts a return force on a second surface 30 of the first piston 18 to return the second piston 19 to the lower position in the second section 16 of the chamber 14 when the pressure on the first surface 27 of the first piston 18 creates a force that is less that the return force of the return means 29.

There is a first seal means 31, such as an o-ring or similar seal, on the first piston 18 to seal pressure and the first fluid from entering the return means section 17 of the chamber 14. There is a second seal means 32, such as an o-ring or similar seal, on the second piston 19 to seal pressure and the second fluid from entering the return means section 17 of the chamber 14. There is a stop means 33, which could be a flat bar or similar device, in the first section 15 of the chamber 14 to limit the travel of the first piston 18.

The apparatus has a first one-way valve means 34 in the pressurized fluid input line 11 to stop the first fluid and the second fluid from entering the pressurized input line 11 from the chamber 14. There is a second one-way valve means 35 in the fluid output line 12 to allow fluid flow in only one direction and to stop fluid beyond the one-way valve 35 from entering the first section 15 of the chamber 14. There is a third one-way valve means 36 in the mixing line 23 to allow fluid flow in only one direction and to stop fluid beyond the one-way valve 36 from entering the mixing line 23.

The fluid injection apparatus 10 has a calibrated metering means 37, shown in FIGS. 2 and 3, attached to the mixing line 23 to allow a preselected amount of the second fluid to flow from the second section 16 of the chamber 14, through the mixing line 23 and into the fluid output line 12. An example of a calibrated metering means is shown in FIG. 3. A calibrated dial 41 rotates a disk 42 that has a plurality of accurately dimensioned orifices 43 through which a calibrated amount of fluid may flow. The dial 41 is numbered to allow the user to select the flow rate or ratio of first fluid to second fluid desired. FIG. 3 also shows an knob 44 and a base 45. There is a mixing means 38 in the fluid output line 12 to mix the second fluid with the first fluid. There is a closure means 39 releasingly sealing the fifth port means 25 and a fourth one-way valve 40 in the closure means 39 to allow air to enter the second section 16 of the chamber 14 and to stop the second fluid from exiting the second section 16 of the chamber 14 through the one-way valve 40. Fastening means 46 may be attached to the input line 11 and to the output line 12 to aid in fastening and removing the apparatus from a hose or pipe.

The foregoing descriptions and drawings of the invention are explanatory and illustrative only, and various changes in shape, sizes and arrangements of parts as well certain details of the illustrated construction may be made within the scope of the appended claims without departing from the true spirit of the invention.

I claim:

1. A hydraulic fluid injection apparatus connectable between a pressurized fluid input line connected to a source of pressurized first fluid and a fluid output line comprising:

a. a container having a chamber with a first section, a second section and a return means section;
   b. the return means section of the chamber being located between a first piston and a second piston;
   c. a first port means in the container entering the first section of the chamber to connect the pressurized fluid input line and to allow a pressurized first fluid to enter the first section of the chamber;
   d. a second port means in the container entering the first section of the chamber to connect the fluid output line and to allow the pressurized first fluid to enter the fluid output line;
   e. a third port means in the container entering the second section of the chamber to connect a mixing line to the second section of the chamber and to allow a second fluid in the second section of the chamber to enter the mixing line;
   f. a fourth port means in the fluid output line to allow the second fluid from the mixing line to enter the fluid output line;
   g. a fifth port means in the container entering the second section of the chamber to allow the second fluid to be placed in the second section of the chamber;
   h. a rod located in the return means section of the chamber connecting the first piston in the first section of the chamber and the second piston in the second section of the chamber wherein pressure on a first surface of the first piston causes the rod to move the second piston from a lower position in the second section of the chamber to an upper position in the second section of the chamber thereby pressurizing and moving a portion of the second fluid out of the second section of the chamber into the mixing line;
   i. a return means in the return means section of the chamber exerting a return force on a second surface of the first piston to return the second piston to the lower position in the section of the chamber when the pressure on the first surface of the first piston is less than the return force of the return means;
   j. a stop means in the first section of the chamber to limit the travel of the first piston;
   k. a first one way valve means in the pressurized fluid input line to stop the first fluid and the second fluid from entering the pressurized fluid input line from the chamber;
   l. a second one-way valve means in the fluid output line to allow fluid flow in only one direction;
   m. a third one-way valve means in the mixing line to allow fluid flow in only one direction;
   n. a closure means releasingly sealing the fifth port means; and
   o. a fourth one-way valve in the closure means to allow air to enter the second section of the chamber and stop the second fluid from exiting the seCond seCtion of the chamber.

2. A hydraulic fluid injection apparatus as defined in claim 1 further comprising:

a. a first seal means on the first piston to seal pressure and the first fluid from entering the return means section of the chamber; and b. a second seal means on the second piston to seal pressure and the second fluid from entering the return means section of the chamber.

3. A hydraulic fluid injection apparatus as defined in claim 1 further comprising:

a. a calibrated metering means attached to the mixing line to allow a preselected amount of the second fluid to flow from the second section of the chamber and into the fluid output line; and b. a mixing means in the fluid output line to mix the second fluid with the first fluid.

4. A hydraulic fluid injection apparatus connectable between a pressurized fluid input line connected to a source of pressurized first fluid and a fluid output line comprising:

a. a container having a chamber with a first section, a second section and a return means section;

b. the return means section of the chamber being located between a first piston and a second piston;

c. a first port means in the container entering the first section of the chamber to connect the pressurized fluid input line and to allow a pressurized first fluid to enter the first section of the chamber;

d. a second port means in the container entering the first section of the chamber to connect the fluid output line and to allow the pressurized first fluid to enter the fluid output line;

e. a third port means in the container entering the second section of the chamber to connect a mixing line to the second section of the chamber and to allow a second fluid in the second section of the chamber to enter the mixing line;

f. a fourth port means in the fluid output line to allow the second fluid from the mixing line to enter the fluid output line;

g. a fifth port means in the container entering the second section of the chamber to allow the second fluid to be placed in the second section of the chamber;

h. a rod located in the return means section of the chamber connecting the first piston in the first section of the chamber and the second piston in the second section of the chamber wherein pressure on a first surface of the first piston causes the rod to move the second piston from a lower position in the second section of the chamber to an upper position in the second section of the chamber thereby pressurizing and moving a portion of the second fluid out of the second section of the chamber into the mixing line;

i. a return means in the return means section of the chamber exerting a return force on a second surface of the first piston to return the second piston to the lower position in the second section of the chamber when the pressure on the first surface of the first piston is less than the return force of the return means;

j. a first seal means on the first piston to seal pressure and the first fluid from entering the return means section of the chamber;

k. a second seal means on the second piston to seal pressure and the second fluid from entering the return means section of the chamber;

l. a stop means in the first section of the chamber to limit the travel of the first piston;

m. a first one-way valve means in the pressurized fluid input line to stop the first fluid and the second fluid from entering the pressurized fluid input line from the chamber;

n. a second one-way valve means in the fluid output line to allow fluid flow in only one direction;

o. a third one-way valve means in the mixing line to allow fluid flow in only one direction;

p. a calibrated metering means attached to the mixing line to allow a preselected amount of the second fluid to flow from the second section of the chamber and into the fluid output line;

q. a mixing means in the fluid output line to mix the second fluid with the first fluid;

r. a closure means releasingly sealing the fifth port means; and s. a fourth one-way valve in the closure means to allow air to enter the second section of the chamber and stop the second fluid from exiting the second section of the chamber.

* * * * *